United States Patent
Ward et al.

(10) Patent No.: US 10,830,137 B2
(45) Date of Patent: Nov. 10, 2020

(54) DE-ICING BY INTEGRAL ELECTRIC HEAT GENERATION

(71) Applicant: UNITED TECHNOLOGIES CORPORATION, Farmington, CT (US)

(72) Inventors: Thomas W. Ward, Manchester, CT (US); Scot A. Webb, Gales Ferry, CT (US); Isaac Jon Hogate, Meriden, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 207 days.

(21) Appl. No.: 15/960,132

(22) Filed: Apr. 23, 2018

(65) Prior Publication Data

US 2018/0238233 A1 Aug. 23, 2018

Related U.S. Application Data

(63) Continuation of application No. 14/765,760, filed as application No. PCT/US2013/075024 on Dec. 13, 2013, now Pat. No. 10,100,732.

(60) Provisional application No. 61/791,731, filed on Mar. 15, 2013.

(51) Int. Cl.
*F02C 7/047* (2006.01)
*F02C 7/32* (2006.01)
*F01D 25/02* (2006.01)

(52) U.S. Cl.
CPC .............. *F02C 7/047* (2013.01); *F01D 25/02* (2013.01); *F02C 7/32* (2013.01); *F05D 2220/76* (2013.01)

(58) Field of Classification Search
CPC ......... H02K 7/1823; F02C 7/32; F02C 7/047; B64D 15/12; B64D 15/163; F01D 25/02
See application file for complete search history.

(56) References Cited

U.S. PATENT DOCUMENTS

| | | | | |
|---|---|---|---|---|
| 2,540,472 A | * | 2/1951 | Winnett | F01D 5/18 219/201 |
| 5,553,815 A | | 9/1996 | Adams et al. | |
| 5,704,567 A | * | 1/1998 | Maglieri | B64D 15/12 244/134 D |
| 5,793,137 A | | 8/1998 | Smith | |
| 6,753,513 B2 | * | 6/2004 | Goldberg | B64D 15/12 219/201 |

(Continued)

OTHER PUBLICATIONS

International Search Report for related International Application No. PCT/US13/075024; report dated Apr. 8, 2014.

(Continued)

*Primary Examiner* — Steven M Sutherland
(74) *Attorney, Agent, or Firm* — Cantor Colburn LLP

(57) ABSTRACT

Systems and methods for de-icing a fan of a gas turbine engine are disclosed. The systems and methods may include an electrical coil an electrical coil operatively associated with a non-rotating forward assembly of the gas turbine engine; a magnet operatively associated with a rotating surface of the fan, the magnet and the electrical coil producing electricity when the fan is in motion; and a heating element operatively associated with a surface on the fan, the heating element being powered by the electricity produced by the magnet and the electrical coil.

20 Claims, 6 Drawing Sheets

(56) References Cited

U.S. PATENT DOCUMENTS

| | | | | |
|---|---|---|---|---|
| 2005/0008482 A1* | 1/2005 | Allford | ............... | F01D 17/162 |
| | | | | 415/175 |
| 2009/0289516 A1 | 11/2009 | Hopewell et al. | | |
| 2010/0314877 A1 | 12/2010 | Finney | | |
| 2010/0319358 A1* | 12/2010 | Hogate | ................... | F02C 7/047 |
| | | | | 60/779 |
| 2011/0024567 A1* | 2/2011 | Blackwelder | .......... | B64D 15/12 |
| | | | | 244/134 D |
| 2011/0309066 A1 | 12/2011 | Hogate | | |
| 2012/0025676 A1 | 2/2012 | Poisson | | |
| 2013/0039759 A1 | 2/2013 | Perkinson | | |
| 2013/0068747 A1* | 3/2013 | Armatorio | ............ | B64D 15/14 |
| | | | | 219/202 |
| 2015/0377129 A1 | 12/2015 | Ward et al. | | |

OTHER PUBLICATIONS

European Search Report for EP Applicaiton No. 13 87 8508.
EP Office Action for Application No. 13 878 508.4; dated Apr. 16, 2020.

* cited by examiner

DE-ICING BY INTEGRAL ELECTRIC HEAT GENERATION

CROSS REFERENCE TO RELATED APPLICATIONS

This application is a continuation of U.S. patent application Ser. No. 14/765,760 filed on Aug. 4, 2015, which is a U.S. National Stage under 35 USC § 371 of International Patent Application No. PCT/US13/075024 filed on Dec. 13, 2013, and claims priority under 35 USC § 119(e) to U.S. Provisional Patent Application Ser. No. 61/791,731 filed on Mar. 15, 2013, the contents each of which are incorporated herein by reference thereto.

FIELD OF THE DISCLOSURE

The present disclosure relates to gas turbine engines, and more particularly, to de-icing systems for gas turbine engines.

BACKGROUND OF THE DISCLOSURE

Operation of aircraft engines in adverse weather conditions or at high altitudes can often lead to ice forming on the exposed surfaces of gas turbine engines. This accumulation of ice on the engine surfaces limits the quantity of air flow to the engine. Such reductions in air flow can result in a reduction of power output, efficiency and/or cooling capacity of the engine. Further, the ice that forms on elements of the gas turbine engine can break loose and be ingested by the engine, potentially causing damage or wear to the engine. Loose ice, airflow inconsistencies, and disturbed airflow can cause performance issues and vibration problems in downstream components of the engine and can also lead to loss of engine efficiency. To combat these issues, most gas turbine engines incorporate a de-icing system to protect the engine components from the undesirable effects of ice accumulation.

Systems and methods to prevent or remove ice formation on gas turbine engines are well known. Engine de-icing systems commonly employ a thermal source, such as hot air bleed from the engine core, which is applied to the engine inlet to melt or evaporate ice build-up on the external surfaces thereof. In earlier designs, the de-icing systems would bleed a portion of the hot gas stream flowing through the engine and direct it through passages in relation to the elements desiring heat. The bled stream then passes through ports into the air stream flowing into the engine. This heated stream causes the engine surfaces to be heated and effectively removes or prevents the accumulation of ice. However, these de-icing systems using the hot air bleed effect engine efficiency in that the extraction of air or heated fluid from the motive gas stream passing through the engine reduces the overall efficiency of the engine. The efficiency loss occurs because the air is bled from the motive gas stream at a high energy point and re-introduced at a low energy point. Mechanisms have been created to operate said de-icing systems on an "as needed" basis, either when ice is detected or suspected; however, such mechanisms add an undesired mechanical complexity to the design of the gas turbine engine.

Other methods have also been developed using electrical elements for gas turbine engine de-icing systems. In addition to, or alternatively to, using hot air bleeds, electrothermal devices have been used to prevent ice formation and to remove ice from engine components. Commonly employed electrothermal de-icers use heating elements that are operatively associated with the area for which de-icing is desired. For example, heating elements may be embedded within the surfaces of a nosecone and/or fairings of the fan of a gas turbine engine. In some recent examples of electrical de-icing systems, the system involves a series of heaters operatively associated with regions of a gas turbine engine. For example, the system may include one heater at the leading-edge of the nosecone of a gas turbine engine, a second heater located aft of the first heater, and a third heater aft of the second heater. All three heaters are electrically-powered to heat the elements of the nosecone and prevent icing of the structure. Further, these systems may employ different heating levels at the different heaters per a schedule or per temperature sensors. Such examples are further detailed in U.S. Patent Publication No. 2011/0309066 ("Engine Inlet Ice Protection System Having Embedded Variable Watt Density Heaters").

When using electrically powered heaters, the de-icing systems generally draw power from the main electrical power source for the aircraft. This can cause an unwanted strain on the power source and also complicate the electrical wiring of the aircraft. Accordingly, it can be seen that an improved engine de-icing system is needed.

SUMMARY OF THE DISCLOSURE

In accordance with one aspect of the disclosure, a system for de-icing a fan of a gas turbine engine is disclosed. The system may include an electrical coil operatively associated with a first rotating surface of the fan. The system may include a magnet operatively associated with a second rotating surface of the fan, the second rotating surface rotating in a direction counter to the first rotating surface, the magnet and the electrical coil thereby producing electricity when the fan is in motion. The system may include a heating element operatively associated with a surface on the fan, the heating element being powered by the electricity produced by the magnet and the electrical coil.

In a refinement, the system may further include a heating controller to control output of the heating element In a further refinement the heating controller is a passive heating controller.

In another further refinement the heating controller is an active heating controller.

In another further refinement the heating controller is part of a line-replaceable unit.

In another further refinement the heating controller is a thermistor connected in series with the heating element.

In another further refinement the heating controller is a microprocessor configured to control heat output of the heating element.

In another refinement, the magnet and the electrical coil are axially disposed relative to each other.

In yet another refinement, the magnet and the electrical coil are radially disposed relative to each other.

In accordance with another aspect of the disclosure, a gas turbine engine is disclosed. The gas turbine engine may include a fan. The gas turbine engine may include an electrical coil operatively associated with a first rotating surface of the fan. The gas turbine engine may include a magnet operatively associated with a second rotating surface of the fan, the second rotating surface rotating in a direction counter to the first rotating surface, the magnet and the electrical coil thereby producing electricity when the fan is in motion. The gas turbine engine may include a heating element operatively associated with a surface on the fan, the heating element being powered by the electricity produced by the magnet and the electrical coil. The gas turbine engine may include a compressor section downstream of the fan, a combustor section downstream of the compressor section, and a turbine section downstream of the combustor section.

In a refinement, the gas turbine engine may also include a heating controller to control output to the heating element.

In a further refinement, the heating controller is a thermistor connected in series with the heating element.

In another further refinement, the heating controller is a microprocessor configured to control heat output of the heating element.

In a further refinement the microprocessor is powered by the electricity produced by the arrangement of the magnet and the electrical coil.

In a further refinement the microprocessor controls the heat output of the heating element per a programmed schedule.

In a refinement, the magnet and the electrical coil are axially disposed relative to each other.

In another refinement, the magnet and the electrical coil are radially disposed relative to each other.

In accordance with another aspect of the disclosure, a method for de-icing a fan of a gas turbine engine is disclosed. The method may include rotating the fan, wherein an electrical coil is operatively associated with a first rotating surface of the fan. The method may include counter rotating a second surface rotating within the gas turbine engine, wherein the second surface is operatively associated with a magnet. The method may include producing electricity from the electrical coil and the magnet when the fan is in motion. The method may include powering a heating element operatively associated with the fan using the electricity produced by the magnet and the electrical coil.

In a refinement, the method may include controlling the output of the heating element using a heating controller.

In another refinement, the method may include providing a heating controller in the form of a microprocessor controlling the heat output of the heating element per a programmed schedule.

Also disclosed is a system for de-icing a fan of a gas turbine engine. The system including: an electrical coil operatively associated with a non-rotating forward assembly of the gas turbine engine; a magnet operatively associated with a rotating surface of the fan, the magnet and the electrical coil producing electricity when the fan is in motion; and a heating element operatively associated with a surface on the fan, the heating element being powered by the electricity produced by the magnet and the electrical coil.

Also disclosed is a gas turbine engine. The gas turbine engine having: a fan; an electrical coil operatively associated with a non-rotating forward assembly of the gas turbine engine; a magnet operatively associated with a rotating surface of the fan, the magnet and the electrical coil producing electricity when the fan is in motion; a heating element operatively associated with a surface on the fan, the heating element being powered by the electricity produced by the magnet and the electrical coil; a compressor section downstream of the fan; a combustor section downstream of the compressor section; and a turbine section downstream of the combustor section.

Also disclosed is a method for de-icing a fan of a gas turbine engine. The method including the steps of: rotating the fan such that a magnet operatively associated with the fan is rotated about an electrical coil located on a non-rotating forward assembly of the gas turbine engine; producing electricity from the electrical coil and the magnet when the fan is in rotated; and powering a heating element operatively associated with the fan using the electricity produced by the magnet and the electrical coil.

These and other aspects and features of the present disclosure will be more readily apparent when taken in conjunction with the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
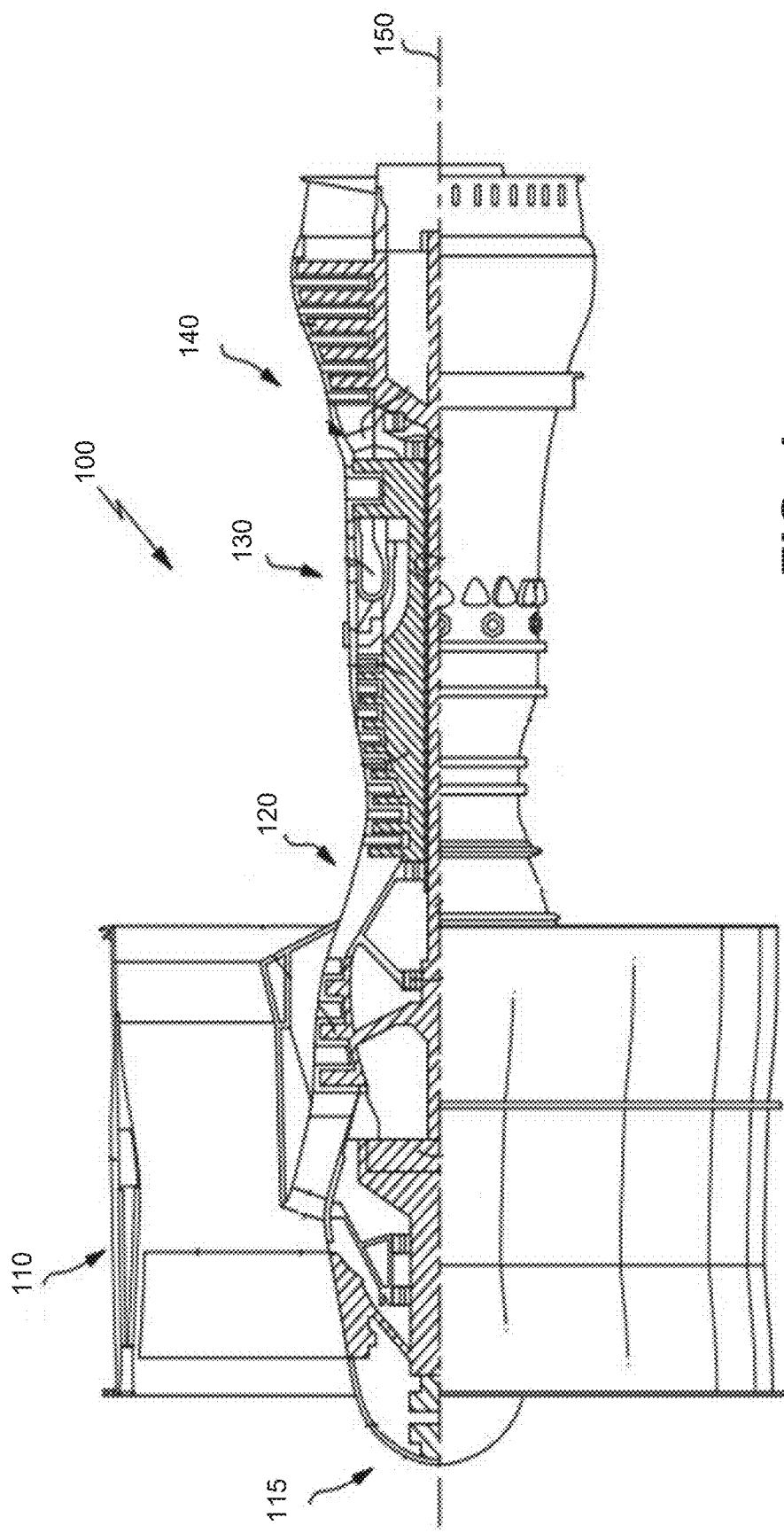
FIG. 1 is a cross-sectional view of a gas turbine engine constructed in accordance with the present disclosure.

Referring to the drawings, and with specific reference to FIG. 1, a gas turbine engine constructed in accordance with the present disclosure is generally referred to by reference numeral 100. Such a gas turbine engine 100 can be used for any number of different applications including, but not limited to, generation of aircraft thrust and land-based power. Moreover, it is to be understood that the sectional view provided in FIG. 1 is included simply to provide a basic understanding of the various sections in a gas turbine engine, and not to limit the invention thereto. The present disclosure extends to all types of gas turbine engines used in all types of applications.

The gas turbine engine 100 may have a fan 110 and a nosecone 115, the fan drawing in ambient air and directing the ambient air to a compressor section 120. The incoming air is greatly compressed by the compressor section 120 and directed to a combustor section 130 where it is mixed with fuel and combusted. The products of that combustion, in the form of very hot and expanding gases, are directed to a turbine section 140 shown to be downstream of the combustor section 130. The turbine section 140 and/or compressor section 120 may each be comprised of a plurality of blades radially extending from a shaft forming rotating sections or rotors. A plurality of vanes may radially extend inwardly from a static section or stator, and are intermeshed with the plurality of blades. In so doing, it can be seen that the turbine section 140, compressor section 120, nosecone 115 and fan 110 all revolve around a central engine axis 150.

Figure 2:
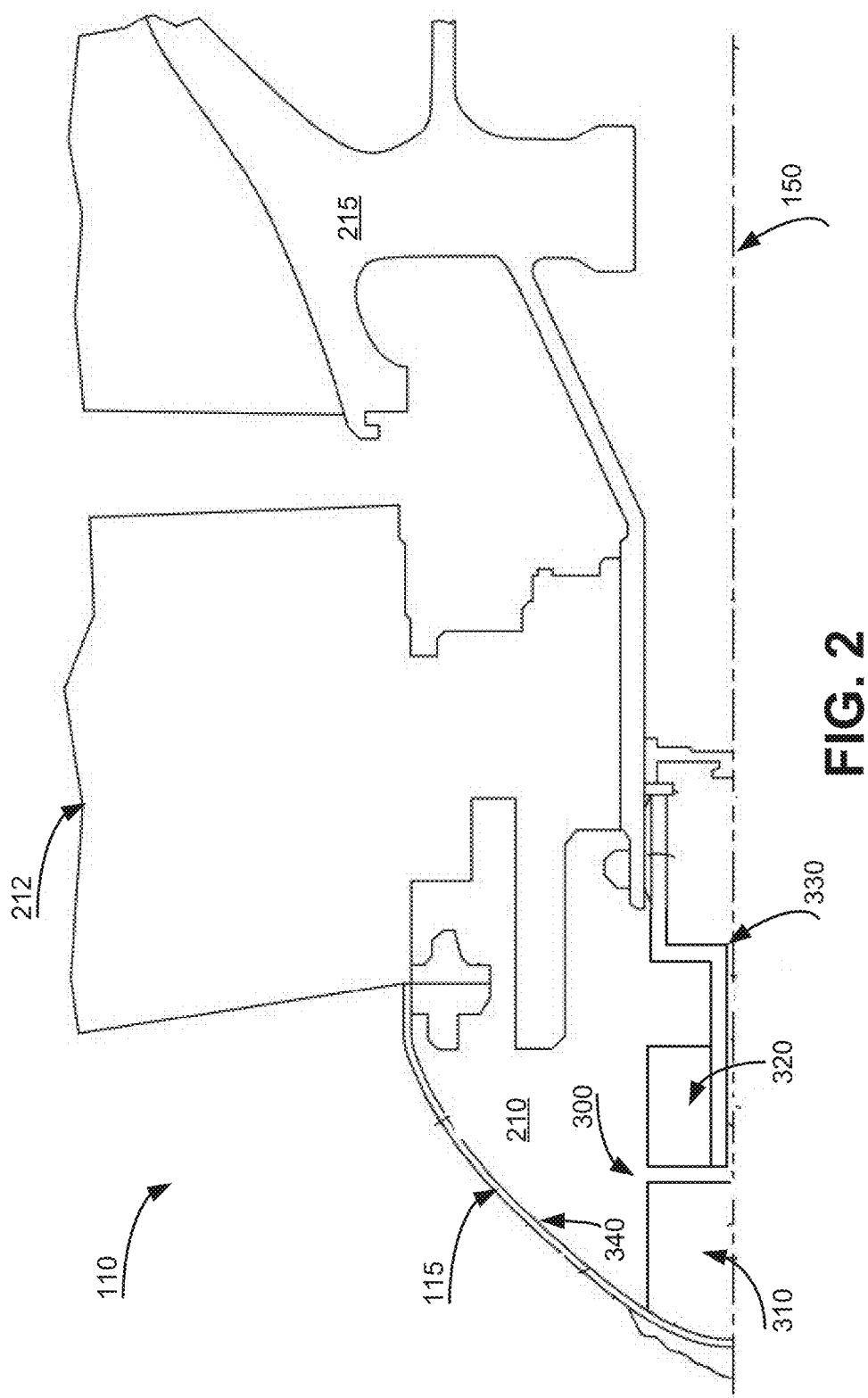
FIG. 2 is a cross-sectional view of a fan and a nosecone of a gas turbine engine with an inlet case constructed in accordance with the present disclosure.

FIG. 2 illustrates a cross-sectional view of the fan 110 and the nosecone 115 of the gas turbine engine 100 of FIG. 1. The fan 110 may be operatively associated with a fan hub 215. Within the nosecone, there is an interior cavity 210.

Further, within the interior cavity 210 of the nosecone, there may be a de-icing system 300. The de-icing system may include an electrical coil 310, a magnet 320, a first rotating surface 335 (e.g., an interior surface of the nosecone 115), a second surface 330 and a heating element 340. The second rotating surface may be operatively associated with a counter-rotating element of the gas turbine engine, wherein the rotation is counter to the first rotating surface 335, and/or the second surface may be operatively associated with a non-rotating element, with respect to the rotation of the first rotating surface 335, of the gas turbine engine. The heating element 340 may be embedded within, mounted to, or otherwise be positioned relative to a surface of the nosecone 115 and/or a surface of the fan 110.

Ice often accumulates on the surfaces of the fan 110 and the nosecone 115 and/or any other surfaces associated with the gas turbine engine 100. The gas turbine engine 100 is normally exposed to the air and thusly bears a high likelihood of significant ice accumulation due to various environmental factors (i.e., temperature changes, pressure changes, precipitation, etc.). This potential accumulation of ice on the surfaces of gas turbine engine 100 may limit the quantity of air flow to the engine. Such reductions in air flow may result in a reduction of power output, efficiency and/or cooling capacity of the gas turbine engine 100. Further, the ice that forms on elements of the gas turbine engine 100 may break loose and be ingested by the gas turbine engine 100, potentially causing damage or wear to the gas turbine engine 100. Systems and methods for de-icing the fan may be beneficial to extend the life of an engine and/or to improve engine performance.

Figure 3:
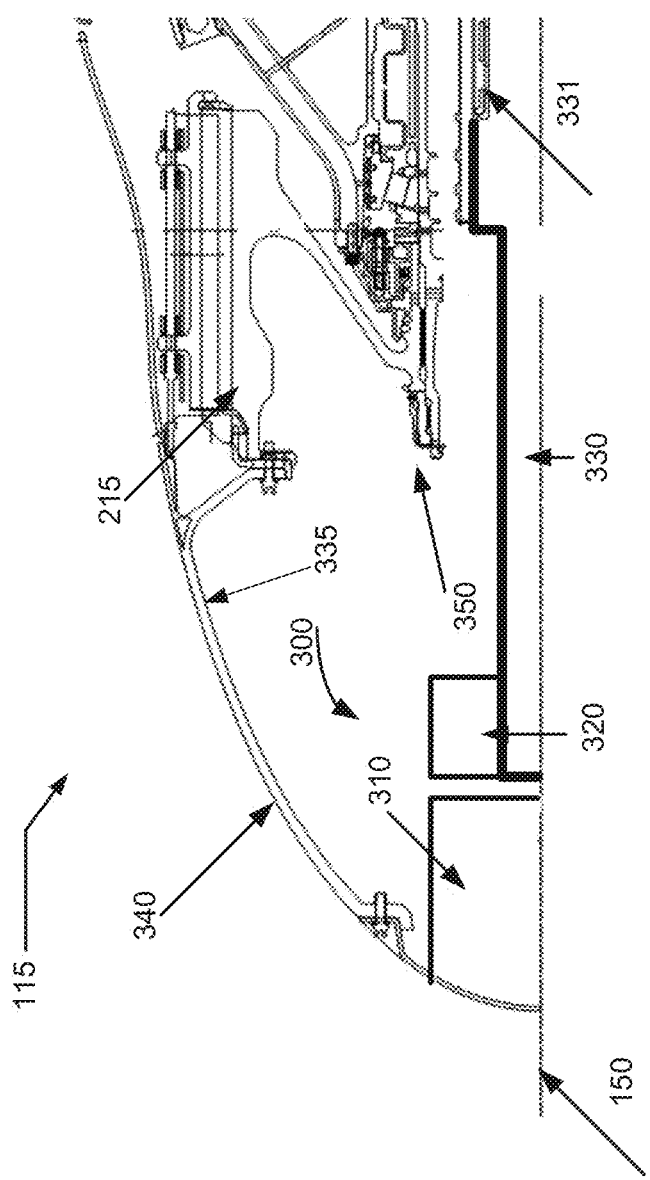
FIG. 3 is a cross-sectional view of a portion of a nosecone of FIG. 1, wherein an electrical coil and magnet are arranged in an axial arrangement.

The present disclosure greatly improves upon the prior art by providing an electrothermal de-icing system which generates electrical energy through electromagnetic induction to power electrical heating elements. A first embodiment of the presently disclosed de-icing system 300 is set forth in FIG. 3. FIG. 3 depicts a cross-section of half of the nosecone 115, as divided by the central engine axis 150. The nosecone 115 may include an electrical coil 310, a magnet 320, a first rotating surface 335, a second rotating surface 330, a heating element 340, and a seal 350. In the present embodiment, the first rotating surface may be an interior surface of the nosecone 115. The electrical coil 310 may be operatively associated with the first rotating surface 335. For example, the coil 310 may be embedded within, mounted to, or otherwise be positioned relative to the first rotating surface 335. The second rotating surface 330 may be attached to another engine shaft such as a low pressure compressor shaft 331 and may rotate in the opposite direction of the rotation of the first rotating surface 335. The magnet 320 may be operatively associated with the second rotating surface 330. For example, the magnet 320 may be embedded within, mounted to, or otherwise be positioned relative to the second rotating surface 330.

When the fan 110 is in motion, the nosecone 115 rotates with the fan as a whole, and the first rotating surface 335 of the fan and the operatively associated electrical coil 310, thusly, rotate with, and in the same direction as, the fan 110. Conversely, the second rotating surface 330 rotates in the opposite direction with respect to the fan 110 and, thusly, the operatively associated magnet 320 rotates in the opposite direction with respect to the electrical coil 310. The electrical coil 310 and the magnet 320 are situated in an arrangement wherein the magnet 320 and electrical coil 310 are in close enough proximity for the electrical coil 310 to create a current. When the electrical coil 310 is in motion due to the rotation of the fan 110 and said motion is in opposition to the motion of the magnet 320, an electromotive force is created. If an electrical connection (i.e. electrical wires, electrical clamps, etc.) is connected through an electrical load or device (i.e. a resistor, a current controller, a heating element 340, etc.), then a current will flow, thusly, converting the mechanical energy derived from the motion of the fan into electrical energy.

The electrical energy generated by the association between the electrical coil 310 and the magnet 320 is then used to power the heating element 340. The heating element 340 is any electrically powered device used to heat the surfaces of the fan 110. The heating element 340 may be a single heating element, it may be a network of heating elements programmed to different heating schedules, or any other arrangement of one or more electrical devices designed to convert electrical energy into thermal energy. The heating element 340 is operatively associated with a surface of the nosecone 115, a surface of the fan 110, a surface of an inlet guide vane assembly 212, and/or any surface associated with the gas turbine engine 100. For example, the heating element 340 may be embedded within, mounted to, or otherwise be positioned relative to a surface of the nosecone 115, a surface of the fan 110, a surface of an inlet guide vane assembly 212, and/or any surface associated with the gas turbine engine 100. The heating levels output by the heating element 340 may be controlled by an optional heating controller 410, which is discussed in greater detail as with respect to FIG. 4. The heat produced by the heating element 340 may be used for, but is not limited to use for, de-icing surfaces of the fan 110, the nosecone 115, the inlet guide vane assembly 112, and/or any other surface associated with the gas turbine engine 100.

A first embodiment of the presently disclosed de-icing system 500 is set forth in FIG. 3 with electrical coil 310 and magnet 320 being axially disposed with respect to each other. In the axial arrangement, the electrical coil 310 rotates at a fixed point about the central engine axis 150; whereas, the magnet 320 rotates in the opposite direction radially about the central engine axis 150. This arrangement may be used to produce electrical power to power the heating element 340.

Figure 4:
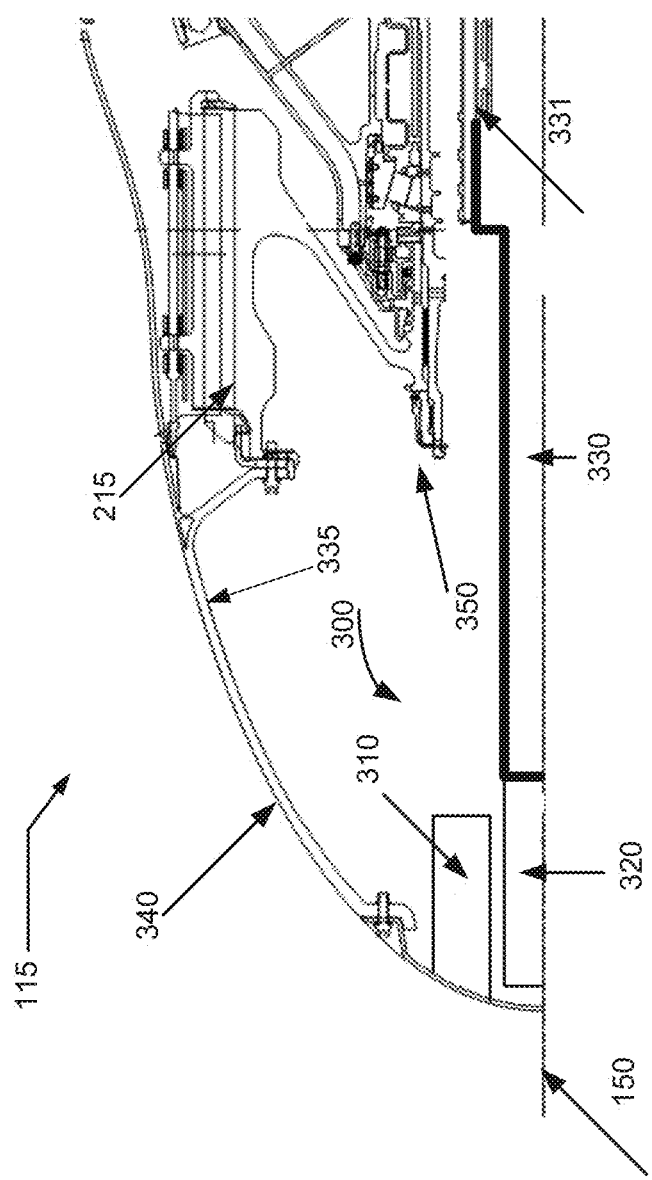
FIG. 4 is a cross-sectional view of the nosecone of FIG. 1, wherein an electrical coil and a magnet are arranged in a radial arrangement.

A second embodiment of the de-icing system 500 is set forth in FIG. 4. As shown, the system 500 may include the electrical coil 310 and the magnet 320 radially disposed relative to each other. In such a radial arrangement, the electrical coil 310 rotates about the central engine axis 150 radially; whereas, the magnet 320 rotates in the opposite direction axially about the central engine axis 150. This arrangement may be used to produce electrical power to power the heating element 340.

FIG. 2 may also illustrate a third embodiment of a de-icing system including a non-rotating forward assembly, such as the inlet guide vane assembly 212, in front of the fan hub 215 and/or in front of any blades associated with the fan hub 215. A nosecone 115 may be connected to the stationary inlet guide vane assembly 212. Generally, the inlet guide vane assembly 212 is connected to a static structure of the aircraft and is configured to remain stationary about the longitudinal axis 150. In this exemplary embodiment, placement of the de-icing apparatus may be as constructed in the manner of the first embodiment described in above with reference to FIG. 3; however, the components placed relative to the nosecone 115 are stationary and the relative rotation is the rotation of the fan 110. Further, one skilled in the art will recognize that the packaging of the magnet assembly and coil assembly can also be in a radial arrangement as shown in FIG. 4.

Figure 5:
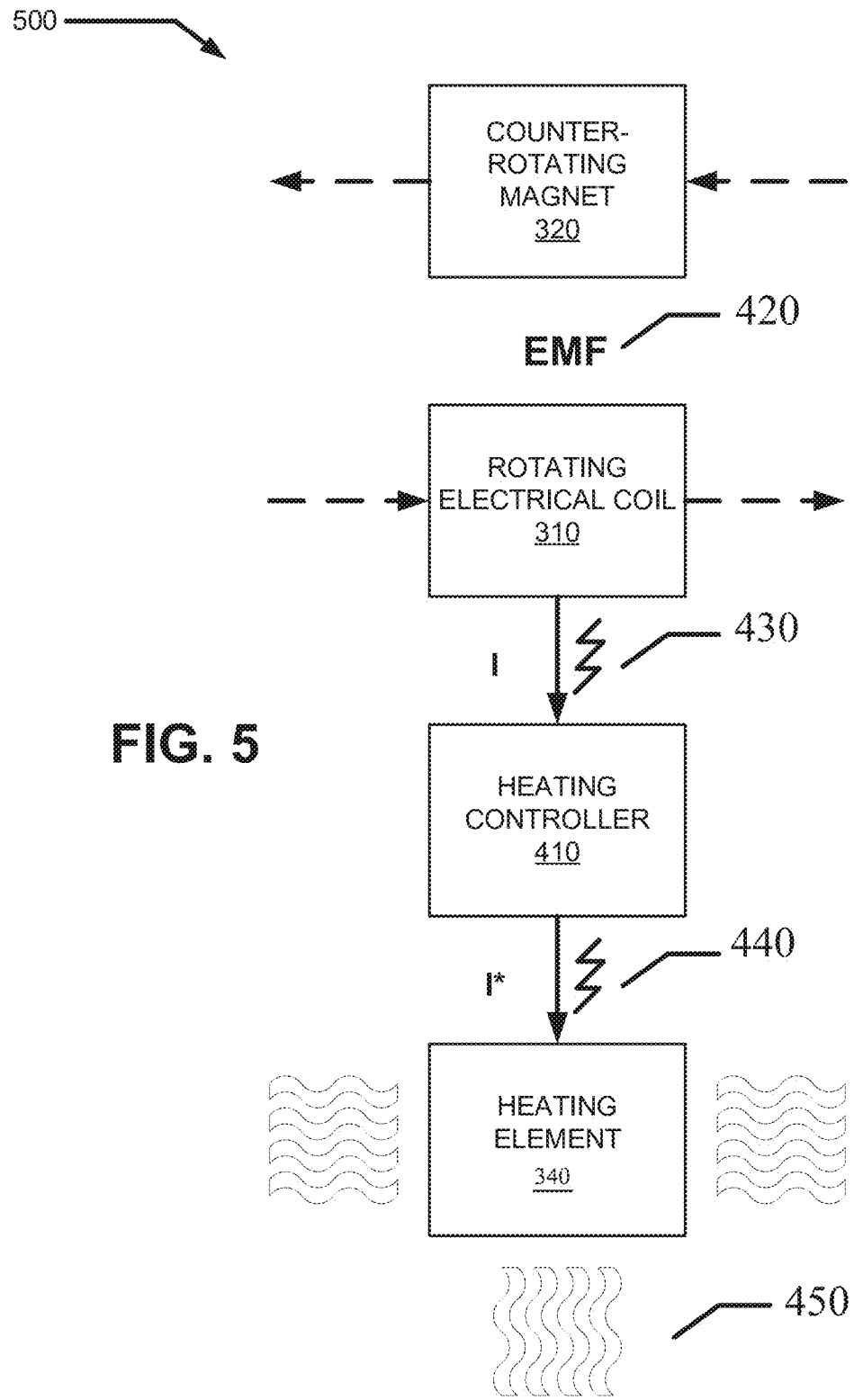
FIG. 5 is a block diagram for an exemplary de-icing method according to the present disclosure.

A block diagram of an exemplary system 500 for implementing the presently disclosed systems for deicing the fan of a gas turbine engine is embodied in FIG. 5. The block diagram includes example electrical coil 310, example counter rotating magnet 320, example heating controller 410, and example heating element 340. The rotating electrical coil 310 rotates radially in a direction. Conversely, the counter-rotating magnet 320 rotates in the opposite direction radially with respect to the radial motion of the rotating electrical coil 310. The counter rotating magnet 320 and the rotating electrical coil 310 are within close enough proximity to each other for which they are able to produce electrical power.

The association between the rotating electrical coil 310 and the counter-rotating magnet produces an electromechanical force (EMF) 420. The EMF 420 is then converted into electrical power because the rotating electrical coil 310 is connected to an electrical element; in this example, the heating controller 410. The produced current (I) 430 is the electrical current converted from the EMF 420.

Referring still to FIG. 5, heating controller 410 receives the produced current 430 and alters the current with respect to powering one or more heating elements and outputs the altered current (I*) 440 to the heating element 340. In some examples, the heating controller is a passive heating controller. In one such example, a passive heating controller may be a thermistor connected in series with the heating element 340. An example thermistor may be a type of resistor whose resistance varies significantly with temperature to act as a self-regulator for the heating element 340. In other examples, the heating controller 410 may be an active heating controller. An example active heating controller may be a microprocessor configured to control the heat output of the heating element 340. In such examples, the microprocessor may be powered by the electricity produced by the arrangement of the magnets and the electrical coils. In some further examples, the microprocessor may control the heat output of the heating elements per a programmed schedule.

The altered current 440 is then received by the heating element 340, wherein the heating element 340 converts the electrical energy into thermal energy 450. The thermal energy 450 then may be purposed to heat the surface of the fan 110, with which the heating element 340 is associated. Heating the surface of the fan 110 and/or the nosecone 115 may be effective in de-icing the fan 110 and/or the nosecone 115 and/or heating may function as an ice protection system for the fan 110 and/or the nosecone 115.

Figure 6:
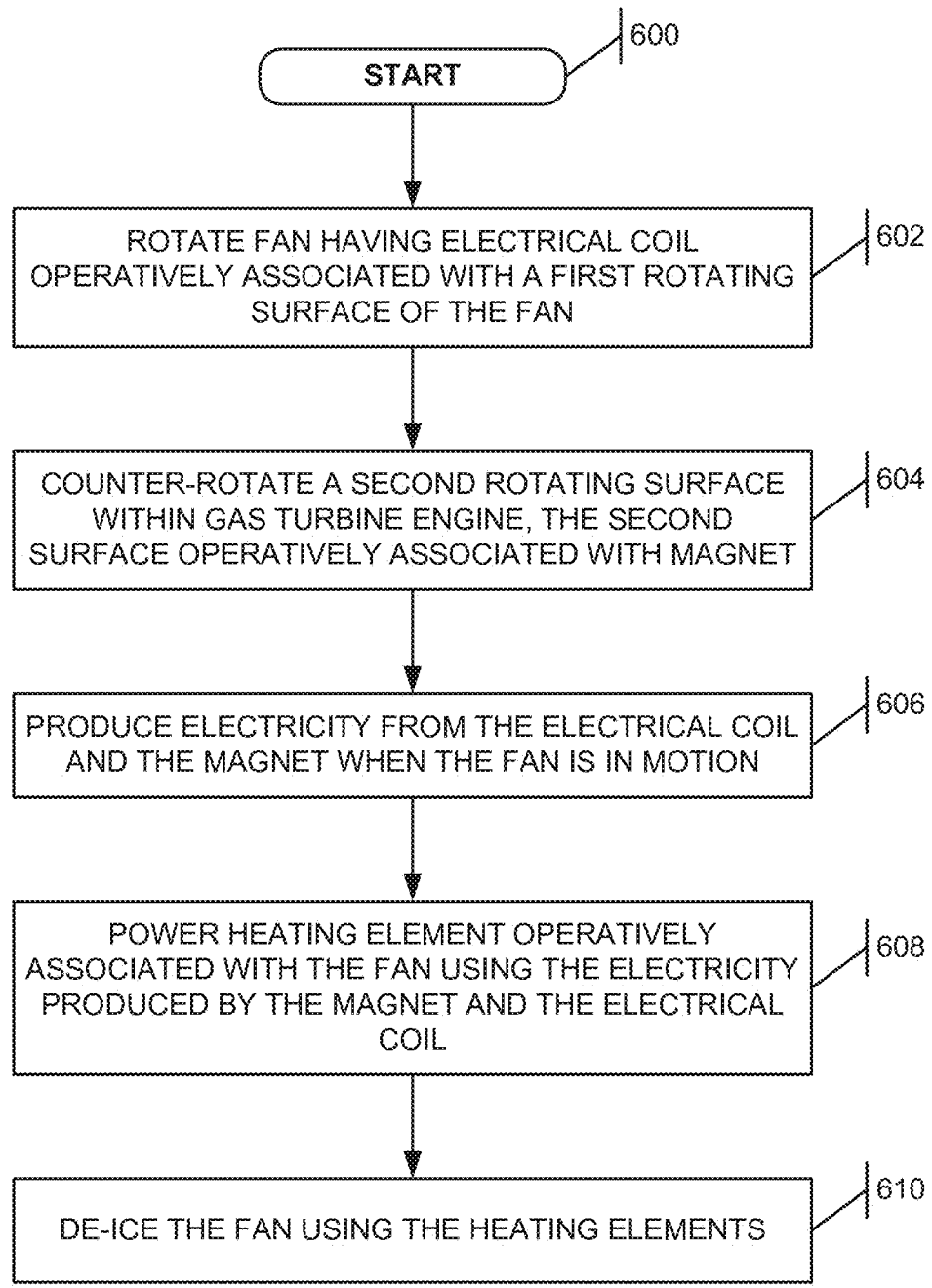
FIG. 6 is a flow chart exemplary of a de-icing method according to the present disclosure.

In operation, an example of the presently disclosed methods for de-icing the fan of a gas turbine engine is depicted in flow chart format in FIG. 6. At block 600, the method begins; this may mean that the gas turbine engine 100 has entered a "starting" phase. When the fan 110 rotates, the nosecone 115 rotates with the fan 110, thusly, the first rotating surface 335 and the operatively associated electrical coil 310 rotate with, and in the same direction as, the fan 110.

At block 604, the second rotating surface 330 rotates in the opposite direction of the fan 110. The magnet 320 is operatively associated with the second rotating surface 330 and thus, the magnet 320 rotates in the opposite direction of the fan 110, and the electrical coil 310.

At block 606, electricity is produced from the electrical coil 310 and the magnet 320. When the electrical coil 310 is in motion due to the rotation of the fan 110 and such motion is in opposition to the motion of the magnet 320, an electromotive force is created. If an electrical connection (i.e. electrical wires, electrical clamps, etc.) is connected through an electrical load or device (i.e. a resistor, a current controller, a heating element 340, etc.), then a current will flow, thusly, converting the mechanical energy derived from the motion of the fan into electrical energy.

At block 608, the heating element 340, which may be operatively associated with the fan 110 and/or the nosecone 115, is powered by the electrical energy produced by the magnet 320 and the electrical coil 310. The heating levels output by the heating element 340 may be controlled by an optional heating controller 410.

Finally, at block 610, the heat output by the heating element 340 may be used to de-ice the fan 110.

INDUSTRIAL APPLICABILITY

From the foregoing, it can be seen that the technology disclosed herein has industrial applicability in a variety of settings such as, but not limited to, systems and methods for de-icing the fans of gas turbine engines. The gas turbine engine may be used in conjunction with an aircraft for generating thrust, or for land-based applications for generating power. Using the teachings of the present disclosure, de-icing systems for a gas turbine engine may be constructed to reduce power usage from other power generators within the aircraft as a whole by generating the electrical energy to power the de-icing system within the fan of the gas turbine engine. This improvement over the prior art may conserve energy and reduce the overall power usage of the de-icing systems of gas turbine engines.

While the present disclosure has been in reference to a gas turbine engine and an aircraft, one skilled in the art will understand that the teachings herein can be used in other applications as well. For example, the disclosed systems and methods for de-icing may be implemented within the rotor of a helicopter, in a similar manner, to de-ice the rotor. It is therefore intended that the scope of the invention not be limited by the embodiments presented herein as the best mode for carrying out the invention, but that the invention will include all equivalents falling within the spirit and scope of the claims as well.

What is claimed is:

1. A system for de-icing a fan of a gas turbine engine, comprising:
   a nosecone defining an interior cavity;
   an electrical coil secured to an interior surface of the nosecone that defines the interior cavity, the nosecone operatively associated with a non-rotating forward assembly of the gas turbine engine;
   a magnet operatively associated with a rotating surface of the gas turbine engine, wherein portions of the interior surface are axially forward of the non-rotating forward assembly, the magnet and the electrical coil producing electricity when the magnet is rotated; and
   a heating element operatively associated with the interior surface on the nosecone, the heating element being powered by the electricity produced by the magnet and the electrical coil.

2. The system of claim 1, further comprising a heating controller to control output of the heating element and wherein the heating controller is a passive or an active heating controller.

3. The system of claim 2, wherein the heating controller is part of a line-replaceable unit.

4. The system of claim 2, wherein the heating controller is a thermistor connected in series with the heating element.

5. The system of claim 2, wherein the heating controller is a microprocessor configured to control heat output of the heating element.

6. The system of claim 1, wherein the non-rotating forward assembly of the gas turbine engine is an inlet guide vane assembly located forward of a fan hub of the fan.

7. The system of claim 1, wherein the non-rotating forward assembly of the gas turbine engine is an inlet guide vane assembly located forward of rotating fan blades of the fan.

8. The system of claim 1, wherein the magnet and the electrical coil are axially disposed relative to each other.

9. The system of claim 1, wherein the magnet and the electrical coil are radially disposed relative to each other.

10. A gas turbine engine, comprising:
a fan;
a nosecone secured to the fan, the nosecone defining an interior cavity;
an electrical coil secured to an interior surface of the nosecone that defines the interior cavity, the nosecone operatively associated with a non-rotating forward assembly of the gas turbine engine;
a magnet operatively associated with a rotating surface of the gas turbine engine, wherein portions of the interior surface are axially forward of the non-rotating forward assembly, the magnet and the electrical coil producing electricity when the fan is in motion;
a heating element operatively associated with at least one of; the interior surface of the nosecone, an inlet guide vane assembly, and a surface on the fan, the heating element being powered by the electricity produced by the magnet and the electrical coil;
a compressor section downstream of the fan;
a combustor section downstream of the compressor section; and
a turbine section downstream of the combustor section.

11. The gas turbine engine of claim 10, further comprising a heating controller to control output of the heating element.

12. The gas turbine engine of claim 11, wherein the heating controller is a thermistor connected in series with the heating element.

13. The gas turbine engine of claim 11, wherein the heating controller is a microprocessor configured to control heat output of the heating element.

14. The gas turbine engine of claim 13, wherein the microprocessor is powered by the electricity produced by the arrangement of the magnet and the electrical coil.

15. The gas turbine engine of claim 13, wherein the microprocessor controls the heat output of the heating element per a programmed schedule.

16. The gas turbine engine of claim 10, wherein the magnet and the electrical coil are either axially disposed relative to each other or radially disposed relative to each other.

17. The gas turbine engine of claim 10, wherein the non-rotating forward assembly of the gas turbine engine is an inlet guide vane assembly located forward of a fan hub of the fan.

18. A method for de-icing a fan of a gas turbine engine comprising:
rotating the fan with respect a nosecone that is secured to a non-rotating forward assembly of the gas turbine engine, the nosecone defines an interior cavity such that a magnet is rotated about an electrical coil secured to an interior surface of the nosecone;
producing electricity from the electrical coil and the magnet when the fan is rotated; and
powering a heating element operatively associated with the fan using the electricity produced by the magnet and the electrical coil, wherein portions of the interior surface are axially forward of the non-rotating forward assembly.

19. The method of claim 18, further comprising controlling the output of the heating element using a heating controller and wherein the non-rotating forward assembly of the gas turbine engine is an inlet guide vane assembly located forward of a fan hub of the fan.

20. The method of claim 18, further comprising providing a heating controller in the form of a microprocessor controlling the heat output of the heating element per a programmed schedule and wherein the non-rotating forward assembly of the gas turbine engine is an inlet guide vane assembly located forward of rotating fan blades of the fan.

* * * * *